United States Patent [19]

Tai

[11] Patent Number: 5,706,029
[45] Date of Patent: Jan. 6, 1998

[54] APPARATUS AND METHOD FOR RETRIEVING DATA FROM A JOYSTICK

[75] Inventor: Chiao-Yen Tai, Hsinchu, Taiwan

[73] Assignee: United Microelectronics Corp., Hsinchu, Taiwan

[21] Appl. No.: 403,976

[22] Filed: Mar. 15, 1995

[51] Int. Cl.$^6$ .................................................. G09G 5/08
[52] U.S. Cl. ........................... 345/161; 345/156; 395/893; 463/38
[58] Field of Search .................. 273/148 B; 463/36–38; 345/156–158, 161, 167; 395/114, 828–832

[56] References Cited

U.S. PATENT DOCUMENTS

| | | | |
|---|---|---|---|
| 4,588,187 | 5/1986 | Dell | 463/36 |
| 4,868,780 | 9/1989 | Stern | 345/161 |
| 5,245,320 | 9/1993 | Bouton | 345/167 |
| 5,350,176 | 9/1994 | Hochstein et al. | 273/148 B |
| 5,421,590 | 6/1995 | Robbins | 345/161 |
| 5,513,302 | 4/1996 | Tsai | 395/114 |
| 5,522,086 | 5/1996 | Burton et al. | 395/829 |

*Primary Examiner*—Steven Saras
*Attorney, Agent, or Firm*—Curtis, Morris & Safford, P.C.

[57] ABSTRACT

A method and corresponding apparatus retrieves data from at least one joystick connected to a video game machine by generating a data locking signal to lock multiple bits of data in at least one joystick in response to a data read signal supplied by the video game machine; generating a data retrieving signal including a plurality of consecutive pulses to retrieve multiple bits of data in the joystick in response to the data read signal; transferring consecutively the multiple bits of data from the joystick to a data register in response to the data retrieving signal wherein the plurality of consecutive pulses is employed to retrieve the multiple bits of data; and reading the multiple bits of data directly from the data register in response to the data read signal by the video game machine. The apparatus using the above method comprises a timing generator for generating a data locking signal to lock multiple bits of data in the joystick or joysticks and a data retrieving signal including a plurality of pulses to consecutively retrieve the multiple bits of data from the joystick in response to a data read signal supplied by video game machine; and a data register for consecutively receiving and storing the multiple bits of data, and outputting the multiple bits of data in parallel according to the data read signal.

13 Claims, 4 Drawing Sheets

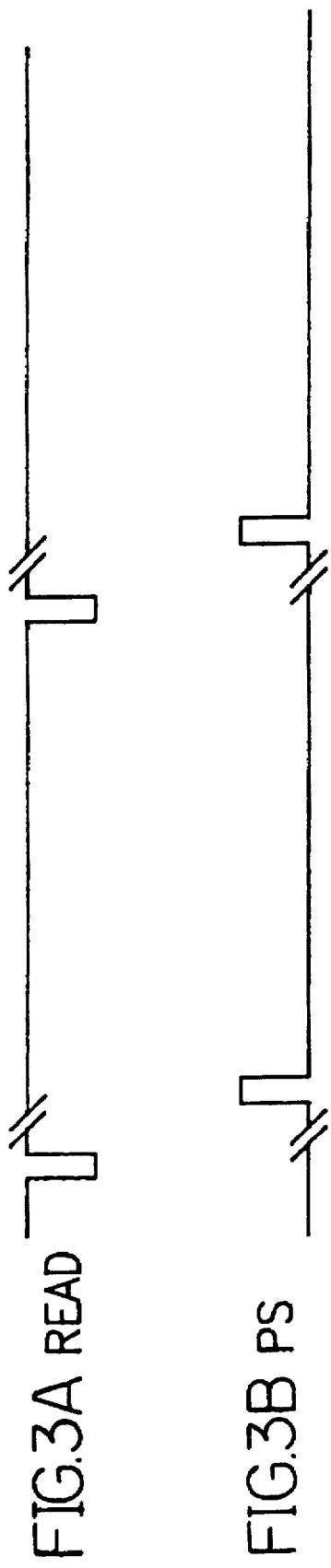
FIG.3A READ
FIG.3B PS
FIG.3C CK
FIG.3D DATA

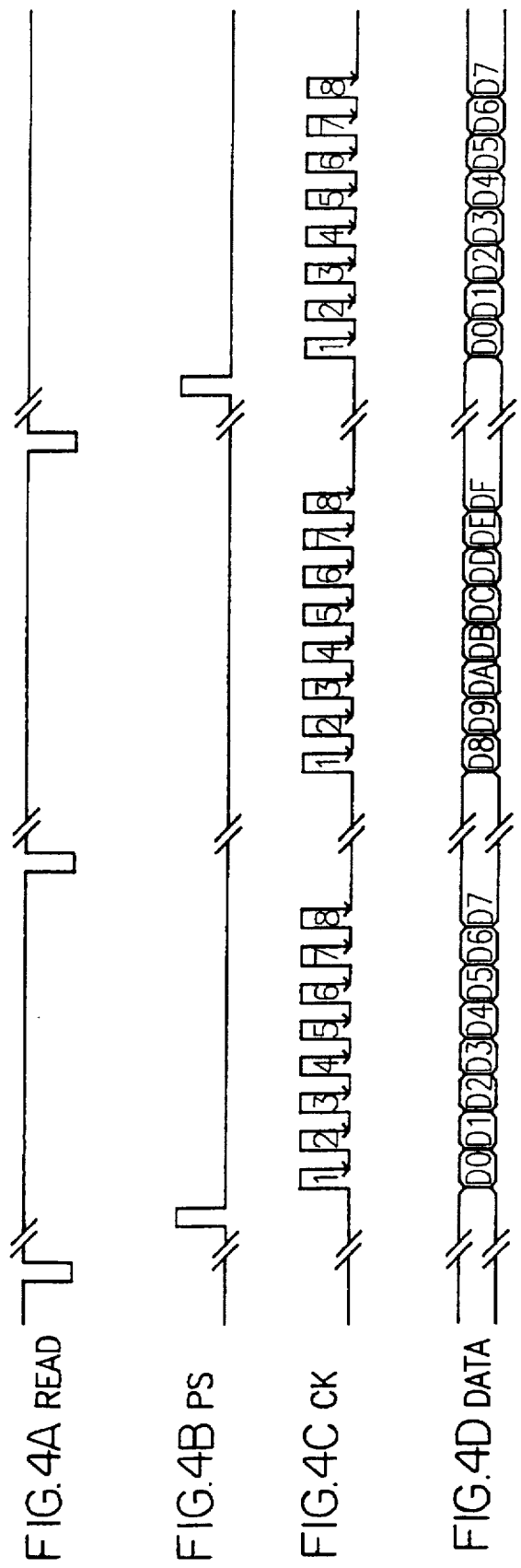

APPARATUS AND METHOD FOR RETRIEVING DATA FROM A JOYSTICK

BACKGROUND OF THE INVENTION

1. Field of the Invention

This invention relates to an apparatus and method for retrieving data from a joystick. More particularly, this invention relates to a data reading device comprising a timing generator and a multiple-bit data register and being positioned between a joystick and a video game machine.

2. Description of Background Art

To date, the existing method for retrieving data from a joystick is to retrieve data generated by the joystick bit by bit by, for example, a central processing unit (CPU) of a video game machine. Therefore, it is necessary for the CPU to generate and supply, for example, 8 read signals to the joystick and then to sequentially retrieve eight bits of data from the joystick at each cycle of data transfer. However, the CPU will spend most of its time retrieving data from joysticks when the game machine is connected to several (e.g., 2 or 4) joysticks. This results in a poor efficiency of the CPU provided in the game machine. To improve this drawback, a CPU with a faster clock frequency can be employed, however, this increases the cost of the video game machine.

SUMMARY OF THE INVENTION

It is therefore an object of the present invention to provide an improved technique which overcomes the drawbacks and disadvantages associated with the aforementioned data retrieving devices and methods.

It is another object of the present invention to provide an apparatus and method for retrieving multiple bits of data from a joystick in response to a read signal supplied by the CPU of the video game machine.

It is still another object of the present invention to provide a data retrieving device between joysticks and a video game machine in order to improve the efficiency of the CPU provided in the video game machine.

In accordance with an embodiment of this invention, apparatus and method is provided for retrieving data between joysticks and a video game machine. The data retrieving device sends a data locking signal and a data retrieving signal to the joysticks and receives multiple bits of data from joysticks after receiving a data read signal from the CPU of the game machine.

In accordance with another embodiment of this invention, apparatus and method is provided for retrieving data from at least one joystick connected to a video game machine by receiving a data read signal from the video game machine, generating and supplying a data locking signal to lock multiple bits of data in the joystick and a data retrieving signal in response to the received data read signal, consecutively receiving and storing the multiple bits of data from the joystick in accordance with the data retrieving signal, and outputting the multiple bits of data in parallel in accordance with the data read signal.

As an aspect of the invention, the video game machine is connected to two joysticks in which the apparatus operates by generating and supplying to the two joysticks the data locking signal and the data retrieving signal in response to one data read signal supplied by the video game machine, receiving and storing data from the two joysticks, outputting to the video game machine the data corresponding to one of the two joysticks in response to the data read signal, and outputting to the video game machine the data corresponding to the other joystick in response to a second data read signal supplied by the video game machine.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example and not intended to limit the invention solely to the embodiments described herein, will best be understood in conjunction with the accompanying drawings in which:

FIG. 3 is a timing diagram of the data retrieving device when 8-bits of data are retrieved in accordance with the present invention; and FIG. 4 is a timing diagram of the data retrieving device when 16-bits of data are retrieved in accordance with the present invention.

In all of the figures, like reference numerals represent the same or similar components of the data retrieving device utilized for the description of the present invention.

DETAILED DESCRIPTION OF THE PREFERRED EMBODIMENTS

Figure 1:
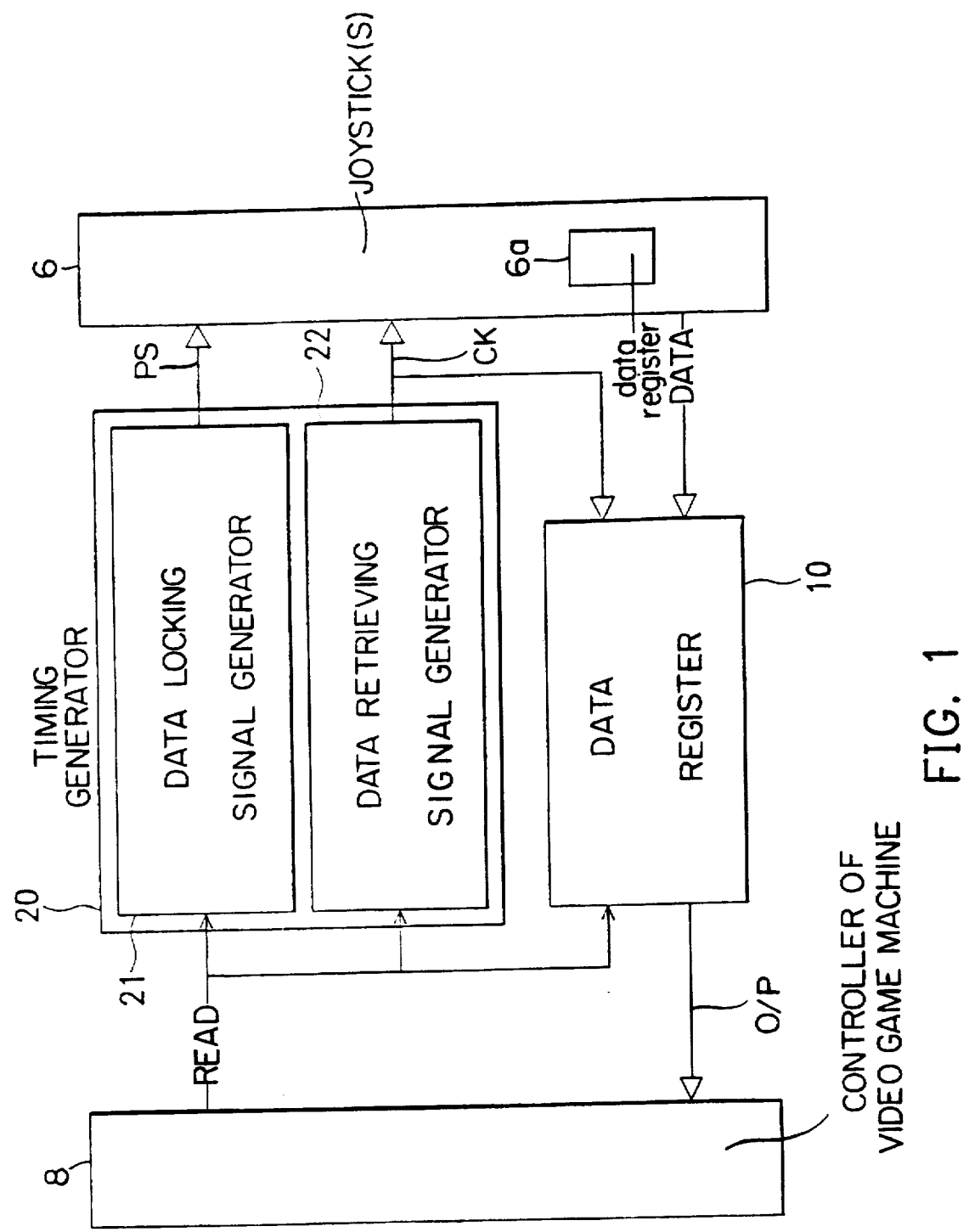
FIG. 1 is a block diagram of the data retrieving device of the present invention.

Reference is now made to FIG. 1, which illustrates a block diagram of the data retrieving device of the present invention, which comprises a timing generator 20 which generates and supplies a data locking signal PS and a data retrieving signal CK to a joystick 6 after receiving a read signal READ supplied by a CPU 8 of the game machine; and a data register 10 which is connected at its input port to the data output terminal of joystick 6 and which is connected at its output port to a data bus of CPU 8, for consecutively receiving a plurality of data bits transferred from joystick 6, converting the plurality of data bits to a parallel signal, and then outputting the parallel signal to CPU 8 of the game machine. As shown in FIG. 1, timing generator 20 includes a data locking signal generator 21 which generates data locking signal PS in order to lock (i.e. hold) the current key-pressed status in a data register 6a of joystick 6 and a data retrieving signal generator 22 which generates data retrieving signal CK in order to retrieve the data stored in data register 6a of joystick 6.

Figure 2:
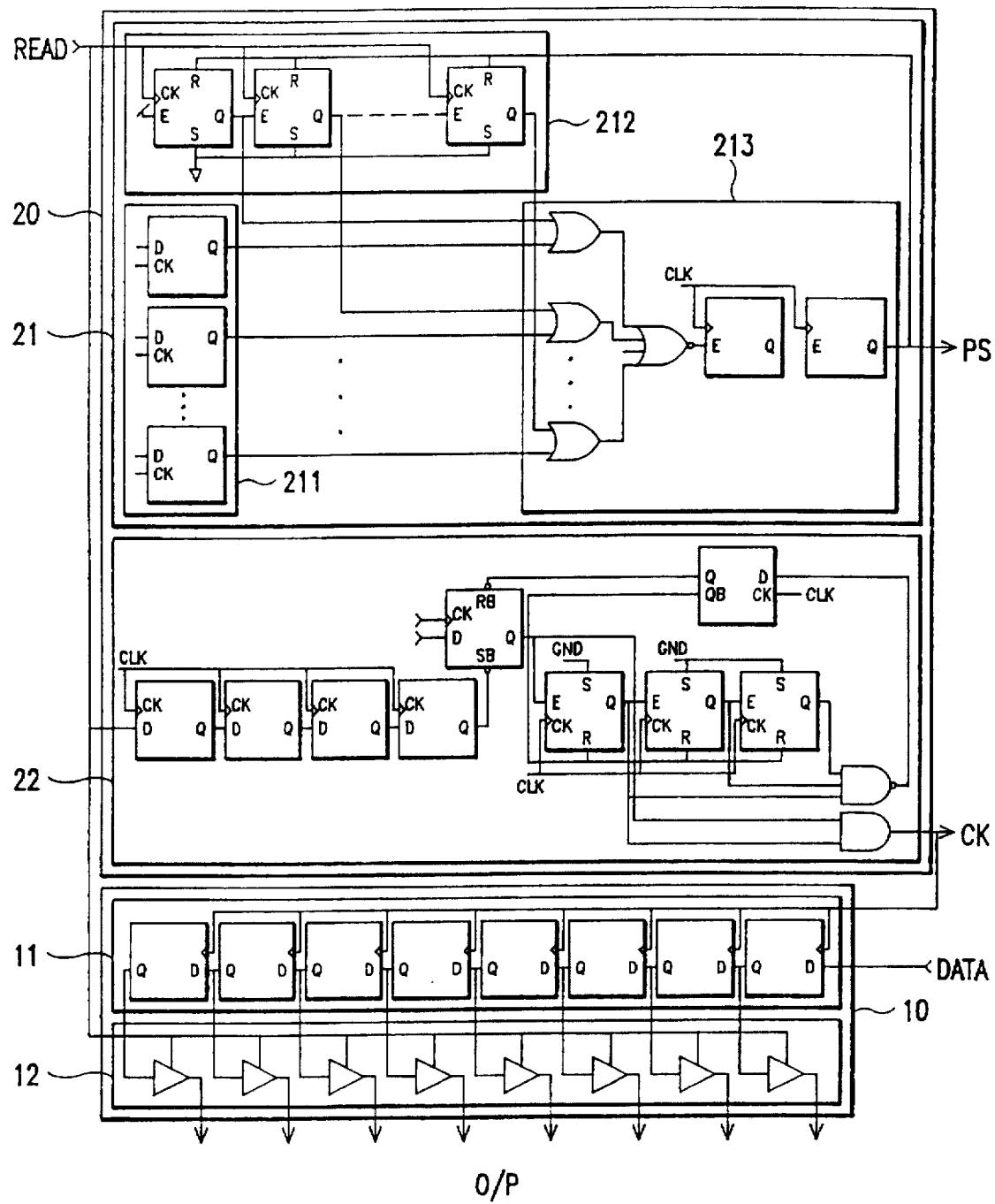
FIG. 2 is a circuit diagram of the data retrieving device in accordance with a preferred embodiment of the present invention.

FIG. 2 is a detailed circuit diagram of the data retrieving device of the present invention. As shown, data register 10 includes a shift register 11, which includes a series of cascaded flip-flops 11a to 11h, and an output controller 12 which includes a series of cascades tri-state buffers 12a to 12h for controlling the output of the data stored in shift register 11 in response to data read signal READ supplied by CPU 8.

Data locking signal generator 21 of timing generator 20 includes a data multiplying parameter register 211, a counting circuit 212 and a comparing circuit 213. Data multiplying parameter register 211 stores a data multiplying parameter which is employed for setting the generation period of data locking signal PS, i.e., the number of data retrieving signals needed and which corresponds to the period for generating one data locking signal. The stored data multiplying parameter represents the number of joysticks connected to the game machine or the amount of data supplied by CPU 8. For example, the value of the data multiplying parameter is 2 when there are 2 joysticks connected to the game machine. Counting circuit 212 calculates the number of data read signals READ supplied by CPU 8. Comparing circuit 213 compares the value of the data multiplying parameter with the value in counting circuit 212, and sends a data locking signal PS to the joysticks in order to lock the current key-pressed status of the joysticks while the data multiplying parameter equals the value contained in counting circuit 212.

FIG. 2 illustrates an exemplary circuit diagram of data retrieving signal generator 22 which is essentially an oscillator which generates consecutive pulses. Data retrieving signal generator 22 generates 8 consecutive data retrieving signals (CK) in response to each data read signal supplied by CPU 8. However, 16, 32 or 64, etc., consecutive data retrieving signals may be generated if needed.

When the value of the data multiplying parameter is set to 1, the number of data bits from joystick 6 (or joysticks) is equal to or less than the number of data bits of CPU 8 of the game machine. Therefore, to retrieve data supplied by the joystick 6, a data read signal READ supplied by CPU 8 is first sent to timing generator 20. Thereafter, data locking signal generator 21 supplies a data locking signal PS to the joysticks to lock the current key-pressed status in data register 6a of the joystick(s). Also, data retrieving signal generator 22 generates and outputs a data retrieving signal consisting of a plurality of consecutive pulses, e.g., 8 pulses. The data locked in data register 6a of joystick 6 is retrieved at each rising edge of the consecutive pulses, and sent to data register 10 at each falling edge of the consecutive pulses. As shown in FIG. 3, 8 bits of data, D1-D8, stored in joystick 6 are retrieved and sent to data register 10 in response to each data read signal READ which enables counting circuit 212 to produce 8 consecutive pulses.

Every time CPU 8 retrieves data from data register 10, CPU 8 adds 1 to the value in counting circuit 212 to maintain the equal relationship between the value set in data multiplying parameter register 211 and the value in counting circuit 212. Thus, comparing circuit 213 still sends a data locking signal PS to the joysticks to lock the next data in joystick 6, and also to counting circuit 212 to clear the data content stored therein (i.e. reset counting circuit 212). As seen in the timing diagram of FIG. 3, data locking signal generator 21 generates a data locking signal PS in response to data read signal READ from CPU 8 after CPU 8 retrieves 8 bits of data.

When there are 2 joysticks connected to the game machine, the value of the data multiplying parameter is set to 2, which indicates that there are 16 bits of data to retrieve (8 bits per joystick). Referring now to FIG. 4, the value stored in data multiplying parameter register 211 is equal to the value in counting circuit 212 only when CPU 8 retrieves data from data register 10 two times (i.e., when 2 data read signals are generated). Then, comparing circuit 213 sends a data locking signal PS to lock the data in the joysticks and to clear the count in counting circuit 212 so as to restart the pulse number count of the data retrieving signal. Data retrieving signal generator 22 generates two data retrieving signals (which includes 16 pulses) in response to two data read signals supplied by CPU 8 while data locking signal generator 21 generates a data locking signal PS to lock the current key-pressed status of the joysticks. Then, the two 8-bit data of the two joysticks are respectively sent to data register 10 in sequence. In other words, CPU 8 retrieves data from data register 10 two times in response to two data read signals READ. Therefore, CPU 8 may retrieve data of one or more joysticks directly from data register 10 with a higher performance and a faster speed.

As described above, by setting the value of data multiplying parameter register 211 with different numbers, a plurality of 8-bit data from a plurality of joysticks connected to the game machine can be consecutively retrieved sequentially by the data retrieving device.

In accordance with the apparatus and method for retrieving data from joysticks as described above, it should be understood that the present invention can provide the CPU of the game machine with a higher efficiency due to the reduction of the number of the data read signals being necessary for retrieving a certain amount of data.

While the present invention has been particularly shown and described with reference to preferred embodiment, it will be readily appreciated by those of ordinary skill in the art that various changes and modifications may be made without departing from the spirit and scope of the invention. For example, the present invention is not limited to 8-bit devices, and may be utilized with 16, 32, 64, 128, etc., bit devices. In addition, other applications including communication with other devices that are similar to joysticks in how they supply data may be utilized with the present invention.

Therefore, it is intended that the claims be interpreted to cover the disclosed embodiment, those alternatives which have been discussed above and all equivalents thereto.

What is claimed is:

1. A method for retrieving data from at least one joystick connected to a video game machine, comprising the steps of:

generating a data locking signal to said at least one joystick in order to lock multiple bits of data in said at least one joystick in response to a data read signal supplied by a video game machine by comparing a preset parameter representing the number of said at least one joystick and a number of times of receiving said data read signal, and then generating said data locking signal when said preset parameter is equal to the number of times of receiving said data read signal;

generating a data retrieving signal which includes a plurality of consecutive pulses to said at least one joystick to retrieve said multiple bits of data in said at least one joystick in response to said data read signal;

transferring consecutively said multiple bits of data in said at least one joystick to a data register in response to said data retrieving signal wherein said plurality of consecutive pulses is employed to retrieve said multiple bits of data; and supplying said multiple bits of data from said data register to said video game machine in response to said data read signal supplied by said video game machine.

2. An apparatus for retrieving data from at least one joystick connected to a video game machine, comprising:

means for generating a data locking signal to lock multiple bits of data in said at least one joystick, said means for generating a data locking signal including counting means, data multiplying parameter registering means and comparing means;

means for generating a data retrieving signal including a plurality of pulses to consecutively retrieve said multiple bits of data locked in said at least one joystick in response to a data read signal supplied by said video game machine;

means for receiving said multiple bits of data and converting said received multiple bits of data to parallel data; and means for outputting said parallel data to said video game machine in accordance with said data read signal.

3. The apparatus of claim 2, wherein said means for generating a data retrieving signal includes oscillating signal generating means for generating a plurality of consecutive pulses.

4. An apparatus for retrieving data from at least one joystick connected to a video game machine, comprising:

a timing generator comprising a data locking signal generator for generating a data locking signal to lock multiple bits of data in said at least one joystick and a data retrieving signal generator for generating a data retrieving signal including a plurality of pulses to consecutively retrieve said multiple bits of data from said at least one joystick in response to a data read signal supplied by said video game machine, said data locking signal generator comprising a counter, a data multiplying parameter register and a comparator; and a data register for consecutively receiving and storing said multiple bits of data, and outputting said multiple bits of data in parallel according to said data read signal.

5. The apparatus of claim 4, wherein said data register comprises a shift register for shifting said consecutively received multiple bits of data, and a plurality of tri-state output buffers for outputting said shifted multiple bits of data in response to said data read signal.

6. The apparatus of claim 4, wherein said data retrieving signal generator is an oscillator for generating a plurality of consecutive pulses.

7. The apparatus of claim 4, wherein said data register comprises a plurality of flip-flops connected in series.

8. An apparatus for retrieving data from two joysticks connected to a video game machine, comprising:

a timing generator for generating, in response to one data read signal supplied by said video game machine, a data locking signal to lock multiple bits of data in said two joysticks and a data retrieving signal including a plurality of pulses to consecutively retrieve said multiple bits of data from said two joysticks, and for supplying to said video game machine, in response to said one data read signal, said data corresponding to one of said two joysticks, and for supplying to said video game machine, in response to a second data read signal supplied by said video game machine, said data corresponding to the other of said two joysticks; and a data register for consecutively receiving and storing said multiple bits of data, and outputting said multiple bits of data in parallel according to said data read signal.

9. The apparatus of claim 8, wherein said data retrieving signal is comprised of two sets of signals each corresponding to a different joystick.

10. A method of retrieving data from two joysticks connected to a video game machine, comprising the steps of:

receiving a data read signal from said video game machine;

generating and supplying to said two joysticks a data locking signal to lock multiple bits of data in said two joysticks and a data retrieving signal in response to a first data read signal supplied by said video game machine;

consecutively receiving and storing said multiple bits of data from said two joysticks in accordance with said data retrieving signal; and outputting in parallel to said video game machine said multiple bits of data corresponding to one of said two joysticks in response to said first data read signal, and outputting in parallel to said video game machine said data corresponding to the other of said two joysticks in response to a second data read signal supplied by said video game machine.

11. The method of claim 10, wherein said step of consecutively receiving and storing includes the step of shifting said consecutively received multiple bits of data.

12. The method of claim 10, wherein said data retrieving signal includes a plurality of pulses in accordance with a number of bits to be received from each joystick.

13. The apparatus of claim 10, wherein said data retrieving signal is comprised of two sets of signals each corresponding to a different joystick.

* * * * *